Figure 1:
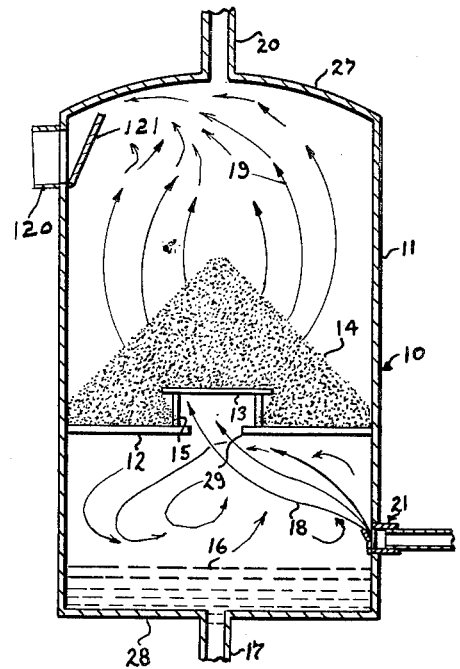

Aug. 28, 1962     O. C. NORTON     3,050,920

AIR DRIER

Filed Aug. 14, 1959

INVENTOR.
ORLO Chir NORTON
BY
Charles L Lovercheck
ATTORNEY

United States Patent Office 3,050,920
Patented Aug. 28, 1962

3,050,920
AIR DRIER
Orlo Clair Norton, 544 Virginia Ave., Erie, Pa.
Filed Aug. 14, 1959, Ser. No. 833,759
3 Claims. (Cl. 55—280)

This invention relates to air driers and, more particularly, to the type of air drier commonly known as a deliquescent type air drier.

The present invention is specifically directed to an improved type of filter and drying material in a granular or pellet form for use in a deliquescent type air drier.

A deliquescent type air drier operates on the principle that as moisture from the air comes in contact with the chemical in the air drier, the chemical is dissolved by the moisture in the air and the dissolved part of the chemical goes into solution. The water soluble deliquescent filter material is preferably in the form of lumps. In an air drier of this type using the drying material disclosed in this invention, there are several characteristics necessary for efficient operation of the material. It should have the following characteristics:

(1) All undissolved chemical should remain in lumped form until dissolved.
(2) A high melting point irrespective of the percent of liquid absorbed by the filter material.
(3) A great affinity for water.
(4) Non-porous to allow a free flow of air.
(5) Non-corrosive or containing an inhibiter to protect the metal tank.
(6) Has no odor to contaminate air passing through the filter material.
(7) Drains freely to prevent plugging of the filter bed.
(8) Remains in lump form in order to present the maximum of surface to the air stream.
(9) Has an antiseptic affect on bacterial, especially when used in connection with food products.

In carrying out the present invention, porous pellets of sodium chloride which are low in deliquescent properties are impregnated at high temperature with calcium chloride which is high in deliquescent sodium, dichromate, soda, polyphase, chromates, zinc, and chloride. These compounds are chemically active. The above chemicals may be mixed with other combinations of chemicals which will not break down into a slurry of flow or have varying melting points.

In practice, moist air is passed up through the filter bed. The bottom of the bed is dissolved by the moisture in the humid air. After the device has been in use for sometime, the sodium chloride in the bottom of the filter bed is dissolved by the moisture from the air. The moisture also dissolves the more deliquescent chemicals progressively as the moist air passes upwardly through the filter bed. As the air emerges at the top, most of the moisture has been removed therefrom and the air has been washed by the solution of water and chemical.

The solution formed by the moisture from the air mixed and absorbed dissolves the chemicals passing down through the filter and is collected in the sump at the lower part of the drier. It may be drained off from the sump. Such a drier is shown in Patent No. 2,642,951.

An example of the drying material disclosed herein is:

100 pounds NaCl
6 pounds CaCl

It is, accordingly, an object of the present invention to provide an improved air drier.

Another object of the invention is to provide an improved air drier in combination with an improved flow control.

A further object of this invention is to provide an improved flow control subcombination.

Still a further object of the invention is to provide an air drier which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
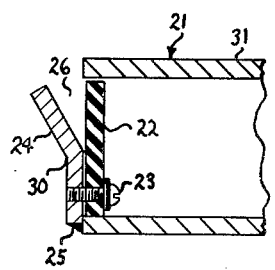

In the drawing:

FIG. 1 is a cross sectional view of a deliquescent type air drier according to the invention; and FIG. 2 is an enlarged cross sectional view of the inlet valve used in the drier shown in FIG. 1.

Now with more specific reference to the drawing, FIG. 1 shows an air drier having a tank 10. The tank 10 may be cylindrical in shape and has a wall 11, an integrally connected top 27, and a bottom 28. An outlet pipe 20 is connected to an opening in the top 27 and a drain 17 is connected to an opening in the bottom 28. Attached to the inside of the hollow cylindrical wall 11 is an inwardly extending flange 12 which is annular in shape with a circular opening 29 in the center thereof. Located on the upper surface of the flange 12 and positioned around the annular periphery of the opening 29 are legs 15 which support a disk like platform 13.

A baffle plate 121 is supported over an outlet 120 to force the air to travel around and allow desiccant to be raised to a higher level. The area for flow around the plate 121 is about one-third the area of the outlet 120. This acts as a restrictor at low pressures to prevent the desiccant from being displaced when the machine is started. This restriction has little effect after the flow of air is established.

To charge the drier, a deliquescent filter material 14 is poured through the outlet 20 onto the top of the platform 13 until the platform 13 is covered approximately as shown. The deliquescent filter material 14 will assume its own angle of repose and will, therefore, not fall through the opening 29.

A valve 21 is disposed in the side wall 11 and below the flange 12. Air enters at high velocity and a valve lip 22 causes particles of fluid to agglomerate into larger particles which can be filtered out by the chemical. The valve 21 is made up of a pipe 31 having a cap 24 welded at 25 on the peripheral surface of the pipe 31. The cap 24 is inclined outwardly at 30 to form an opening 26. The inner surface of the inclined portion forms a nest for the member 22. The valve lip 22 is firmly held in place by a screw 23 which is threaded into the cap 24 as shown in FIG. 2.

In operation, air flowing as at 18 taken from the compressed air line may contain moisture. As air is passed through the valve 21, the small particles of moisture are agglomerated into larger particles which drop into the bottom of the air drier tank 10 as liquid 16. The air indicated at 18 is now partly de-humidified and will now flow upwardly through the opening 29 in the flange 12 and filter through the deliquescent material 14 to emerge as moisture free air 19 to be piped out of the tank 10 at the outlet pipe 20 in the top 27 of the air dried tank 10.

It has been discovered that oil dispersed in the air of such small size that it may be considered oil in gaseous form will not become coated on the inside of a pipe line but will be precipitated out by the valve shown in the combination herein.

The remaining moisture is liquefied in the deliquescent material 14 and drains into the bottom 28 of the tank 10.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A deliquescent type air drier comprising a tank having an inlet for compressed gas spaced from the bottom and an outlet adjacent the top, support means for a deliquescent chemical between said inlet and said outlet in the path of air from said inlet through said chemical to said outlet, and a valve connecting said inlet to the interior of said tank, said valve comprising a diaphragm member made of resilient flexible material fixed to said inlet and extending across said inlet, said resilient flexible material being deflectable by said air to allow said air to flow through an opening, said air being increased in velocity as it passes said diaphragm member whereby particles of moisture entrained in said air are agglomerated into liquid collected in the bottom of said tank.

2. An air drier comprising a tank, an outlet at the top of said tank and an inlet for compressed gas spaced from the bottom thereof, support means for a chemical in pellet form disposed between said inlet and said outlet, a chemical in pellet form on said support means, air flowing through said pellet chemical supported on said support means, a valve connecting said inlet to the interior of said tank, said valve comprising a pipe, a rigid closure over the inner end of said pipe, said closure being deflected inwardly to form an opening partly closing the end of said pipe, a diaphragm member attached to said closure, said diaphragm member being made of resilient flexible material in the form of a flat, relatively thick piece forming a closure for said opening, said diaphragm member having one side thereof fixed to said rigid closure and bendable by air flowing through said inlet deflected to lie on said closure by air flowing through said inlet, said diaphragm member restricting said opening to form a restrictive opening, said air flowing through said opening having its velocity increased whereby the moisture therein is agglomerated into liquid particles collected at the bottom of said tank.

3. The air drier recited in claim 2 wherein said closure covers approximately half of said opening in said inlet and then extends toward the inside of said tank and said diaphragm member is attached to said rigid closure by means of a screw.

References Cited in the file of this patent

UNITED STATES PATENTS

| | | |
|---|---|---|
| 385,999 | Chase | July 10, 1888 |
| 870,546 | Cooke | Nov. 12, 1907 |
| 1,518,162 | Parkinson | Dec. 9, 1924 |
| 2,071,811 | Batuska et al. | Feb. 23, 1937 |

FOREIGN PATENTS

| | | |
|---|---|---|
| 23,634 of 1900 | Great Britain | Dec. 21, 1901 |
| 798,088 | Great Britain | July 16, 1958 |
| 132,429 | Germany | of 1902 |